United States Patent [19]
Dussourd et al.

[11] 3,834,136
[45] Sept. 10, 1974

[54] GAS DRYING APPARATUS AND METHOD

[75] Inventors: Jules L. Dussourd, Princeton;
Ronald L. Haugen, Pennington,
both of N.J.

[73] Assignee: Ingersoll Rand Company, Woodcliff Lake, N.J.

[22] Filed: Apr. 10, 1973

[21] Appl. No.: 349,655

[52] U.S. Cl............................ 55/33, 55/163, 55/189
[51] Int. Cl............................................. B01d 53/04
[58] Field of Search............ 55/33, 58, 62, 163, 189

[56]  References Cited
UNITED STATES PATENTS

| | | | |
|---|---|---|---|
| 1,798,733 | 3/1931 | Hasche | 55/33 |
| 3,182,435 | 5/1965 | Axt | 55/33 X |
| 3,395,511 | 8/1968 | Akerman | 55/33 X |
| 3,659,399 | 5/1972 | Kauer, Jr. et al. | 55/33 X |
| 3,696,588 | 10/1972 | Dussourd et al. | 55/163 |

Primary Examiner—Samih N. Zaharna
Assistant Examiner—Richard W. Burks
Attorney, Agent, or Firm—Bernard J. Murphy

[57] ABSTRACT

The subject apparatus was devised for compressed gas drying systems which typically use vacuum-producing devices for evacutating a gas drying desiccant chamber. The invention comprises the use of an ejector for evacuating the gas drying desiccant chamber, in a first mode of operation, and the use of the ejector as a simple fluid conductor or connector, for directing compressed gas to the desiccant chamber, in a second mode of operation. A fluid-signal control valve opens and closes the ejector outlet, to effect the first and second modes of operation. The method comprises closing off an ejector diffusor to cause cycling or shunting of the gas directed thereinto to the vacuum port of the ejector.

10 Claims, 1 Drawing Figure

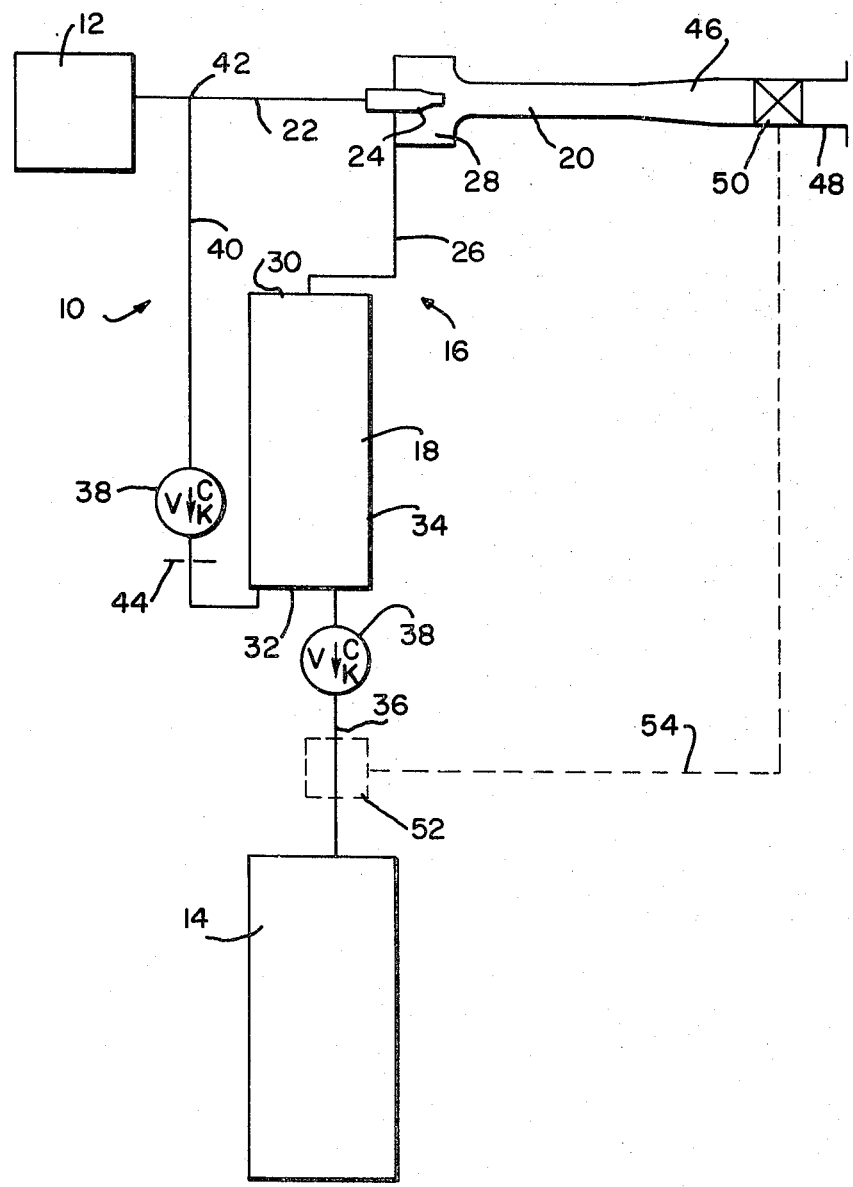

GAS DRYING APPARATUS AND METHOD

This invention pertains to regenerative gas drying systems, and in particular such gas drying systems which use a vacuum-producing device, such as an ejector, for evacuating a gas drying desiccant chamber to cause a regeneration of the gas drying medium, the desiccant. Typical of such systems is that disclosed in our prior Pat. No. 3,696,588 issued on Oct. 10, 1972 for a "Gas Drying Apparatus and Method". The prior patented apparatus and method comprise the use of a four-way valve which is fluid-signal responsive to cause a switching of the system between a gas drying and receiver charging operation, to a desiccant regeneration operation. The difficulty with such prior systems is that it is possible for the four-way valve to become arrested in the regenerative mode, which would render the system disabled and useless. The present invention sets forth an improvement of systems such as those presented in Pat. No. 3,696,588, and others of this type. The method disclosed herein obviates any requirement for a four-way valve, yet the method is wholly useful for systems which do employ a four-way valve, in that it is effective for changing ejector operation from venting of regenerative gas flow to a "short-circuit" of gas cycling through the ejector so that gas can be sent through desiccant and then into the receiver.

It is an object of this invention to set forth gas drying apparatus, for a compressed gas system having a gas compressor and a coupled gas receiver, the apparatus comprising gas drying chamber means for admitting gas therethrough, and for drying such admitted gas therewithin, first and second means coupled to said chamber means for admitting gas to said chamber means and for conducting dried compressed gas from said chamber means, respectively; fluid-powered, vacuum-producing means, operative in a first mode for evacuating fluid from said chamber means, and operative in a second mode for directing fluid therethrough to said chamber means; said vacuum-producing means being in fluid flow communication with one of said first and second means to cause operation of said vacuum producing means in said first and second modes; and means coupled to both said one means and said vacuum producing means for changing operation of said vacuum producing means from one of said first and second operative modes to the other thereof.

Another object of this invention is to teach ejector means, for use with desiccant chamber gas drying apparatus for evacuating the chamber, the means comprising an elongated ejector; said ejector having an outlet at one end thereof, and gas inlet means at the other end thereof, for admitting both primary motive gas, and for ingesting gas or vapor into said ejector for venting thereof through said outlet; and venting control means, coupled to said outlet, operative for opening and closing said outlet.

A further object of the invention, is to teach a method for use with a diffusor-type ejector powered by a primary compressed gas line to evacuate the chamber via a secondary, ejector-to-chamber gas line, of changing ejector operation from a chamber evacuating mode of operation, to a gas through-cycling mode of operation, comprising the step of closing off the ejector diffuser to cause gas in the primary gas line to be passed through the ejector into the secondary gas line.

A feature of this invention comprises an apparatus devised for compressed gas systems which typically use vacuum-producing devices for evacuating a gas drying desiccant chamber. The invention teaches the use of an ejector for evacuating the gas drying desiccant chamber in a first mode of operation, and the use of the ejector as a simple fluid connector, for sending compressed gas to the desiccant chamber, in a second mode of operation. A fluid-signal control valve opens and closes the ejector outlet to effect the first and second modes of operation. The method comprises closing off an ejector diffusor to cause cycling or shunting of the gas directed thereinto to the vacuum port of the ejector.

Further objects and features of this invention will become more apparent by reference to the following description taken in conjunction with the accompanying FIGURE, the latter being a schematic of an embodiment of the novel gas drying apparatus which can practice the method described herein.

As shown in the figure, a typical compressed gas system 10 comprises a compressor 12, and a receiver 14 for storing compressed gas therewithin. The novel gas drying apparatus 16 comprises a gas drying chamber 18, which is of the desiccant type, and an ejector 20 used for evacuating chamber 18 to cause a regeneration of its chamber-confined desiccant. A primary gas line 22 is connected from the compressor 12 to the ejector nozzle 24 to cause operation of the ejector 20 in a normal ejector function. A second gas line 26 communicates the ejector with chamber 18 so that, in a first mode of operation, the ejector 20 will withdraw vapor from the chamber 18 by way of line 26. Line 26 opens onto the vacuum chamber 28 of the ejector.

Chamber 18 is defined by having a top wall 30, bottom wall 32 and side wall 34, and line 26 is coupled to and through top wall 30. A dried gas supply line 36 communicates through the bottom wall 32 and through check valve 38, with the receiver 14. A purge gas line 40 is joined to line 22 by means of a divider junction 42. At this junction, a portion of the compressor output is passed through line 40, and through a second check valve 38, for entry into chamber 18 either for passing this portion through chamber 18 to the ejector, or for passing a portion directly to the receiver 14, as will be explained more fully in the following text. It is some 5 percent (approximately) or less of the compressor output which is conducted through line 40; orifice 44 is disposed in line 40 to insure that it is not more than 5 percent of the compressor supply which is tapped off from line 22.

The ejector 20 has a diffusor end 46 to which is coupled a duct 48 in which is a two-position, open-close valve 50. A pressure-sensing valve actuator 52 is coupled to, and in fluid-flow communication with, line 36, and through mechanical coupling 54 is operatively coupled to valve 50. Acutator 52 is operative of valve 50 in response to a given fluid back pressure manifested by receiver 14.

In normal gas drying operation, with little or no back pressure in receiver 14, valve 50 is in its closed position. Thus compressor 12 conducts compressed gas through lines 22 and 26 to the chamber 18. The compressed gas is dried within chamber 18 and passed on for storage in receiver 14. A minimal portion, i.e. less than 5 percent of the compressed gas supply may freely by-pass chamber 18, via line 40 and not be dried. However such a small portion of undried gas is quite within acceptable limits for a dry gas supply.

Just how much gas will by-pass the chamber 18, via line 40 and the second check valve 38, depends largely upon the operating characteristics of the valve 38 which is interposed in line 40. It is our teaching to use a standard, commercial check valve which is resiliently or otherwise biased to open when met with a given $\Delta P$, i.e, a specified "cracking pressure". Now, such a standard, off-the-shelf valve will be responsive to a $\Delta P$ which s greater than the normal pressure drop across the chamber 18—occasioned by the flow of gas through the chamber-confined desiccant. Accordingly, with fresh desiccant (having no foreign, particulate or viscous matter lodged therein), a normal pressure drop can be maintained across chamber 18. Thus, it can be anticipated that all of the gas flow will be through lines 22 and 26, via nozzle 24 and chamber 28, into chamber 18, when valve 50 is in the closed position. Over long periods of use, as the biasing means of the check valve 38 (in line 40) fatigue and/or as the desiccant in chamber 18 becomes "dirty" and more resistant to gas flow therethrough, this check valve can open to by-pass the aforenoted minimal portion of gas. But, to repeat: so small a quantity of undried gas is both insignificant and acceptable for common end item usages.

Therefore, with valve 50 in the closed position, all or substantially all of the gas is passed through the nozzle 24 and into the vacuum chamber 28 where it is "short-circuited" or shunted through line 26. Accordingly, in this mode of operation (with valve 50 closed) the ejector 20 serves simply as a coupler or connector between lines 22 and 26. Very simply, the ejector serves no vacuum function.

When the receiver 12 has a full charge of dried gas, back pressure causes the operation of the actuator 52 which, is turn, opens valve 50. Thereupon the ejector 20 proceeds to evacuate chamber 18. In this operative mode, now, the full orifice-determined portion of "purging" compressed gas, i.e., the 5 percent or whatever, is conducted through line 40, passed through chamber 18 in a countercurrent flow to regenerate the desiccant, ingested, through line 26, into vacuum chamber 28, and vented by way of duct 48.

In practicing this method, typically on a system such as that disclosed in our prior Pat. No. 3,696,588, it remains only to close off the ejector diffuser by any means to cause the ejector to short-circuit the gas therethrough to the desiccant chamber and the receiver. Therefore, even four-way valve systems as taught in prior art arrangements are susceptible of improvement through our teaching of a simple and expedient method of converting a frozen or otherwise "arrested" arrangement from system desiccant regeneration to a receiver-charging mode of operation.

While we have described our invention in connection with a specific embodiment thereof and a particular method of practice it is done only by way of example, and not as a limitation to the scope of the invention as set forth in the objects thereof and in the appended claims.

We claim:

1. For a compressed gas system having a gas compressor, and a coupled gas receiver, gas drying apparatus, comprising:

gas drying chamber means for admitting gas therethrough and for drying such admitted gas therewithin;

first and second means coupled to said chamber means for admitting compressed gas to said chamber means, and for conducting dried, compressed gas from said chamber means, respectively;

fluid-powered, vacuum-producing means, operative in a first mode for evacuating fluid from said chamber means, and operative in a second mode for directing fluid therethrough to said chamber means;

said vacuum-producing means being in fluid flow communication with one of said first and second means, to cause operation of said vacuum-producing means in said first and second modes; and means coupled to both said one means and said vacuum-producing means for changing operation of said vacuum producing means from one of said first and second operative modes to the other thereof.

2. Apparatus, according to claim 1, wherein:

said vacuum-producing means comprises a fluid-powered ejector.

3. Apparatus, according to claim 1, wherein:

said vacuum-producing means comprises an elongated fluid-powered ejector having a fluid inlet means at one end thereof for admitting gas into said ejector, and fluid outlet means at the end opposite for venting gas from said ejector;

said operation-changing means comprises valving means coupled to said fluid outlet means, operative in first and second valving dispositions, respectively, for opening and closing said outlet means to the conduct of gas therethrough to effect operation of said ejector in said first and second modes, respectively.

4. Apparatus, according to claim 3, wherein:

said operation-changing means further comprises means coupled to said valving means and to said second means for sensing fluid back pressure in said second means, and operative of said valving means, upon sensing a predetermined back pressure, to dispose said valving means in one of said first and second dispositions.

5. Apparatus, according to claim 4, wherein:

said fluid outlet means comprises a venting duct;

said valving means comprises an on-off valve disposed within said duct;

said second means comprises a conduit; and said sensing means comprises a sensor in fluid communication with said conduit.

6. Apparatus, according to claim 1, wherein:

said chamber means comprises a walled chamber;

said first means comprises a first conduit coupled at one end thereof to said chamber said one end opening onto said chamber through a given wall thereof;

said second means comprises a second conduit coupled at one end thereof to said chamber, said one end of said second conduit also opening onto said chamber through a wall thereof other than said given wall; and further including a third conduit coupled at one end thereof to said chamber, for channeling purge fluid to said chamber;

said one end of said third conduit opening onto said chamber through a wall thereof other than said given wall.

7. Apparatus, according to claim 6, wherein:
said third conduit is coupled at the opposite end thereof to said first conduit,
said opposite end of said third conduit opens onto said first conduit intermediate the ends of said first conduit.

8. Apparatus, according to claim 6, wherein:
one of said first and third conduits has orifice means for restricting fluid flow therethrough to a predetermined value.

9. Apparatus, according to claim 6, wherein:
said third conduit has an orifice interpositioned therein for restricting the channeling of purge fluid therethrough to a predetermined value.

10. For use with a desiccant chamber, compressed gas drying system which uses a diffusor-type ejector powered by a primary, compressed gas line to evacuate the chamber via secondary, ejector-to-chamber gas line, a method of changing ejector operation from a chamber-evacuating mode of operation to a gas through-cycling mode of operation, comprising the step of:
closing off the ejector diffusor to cause gas from the primary gas line to be passed through the ejector into the secondary gas line.

* * * * *